(12) United States Patent
Yoo et al.

(10) Patent No.: US 11,559,171 B2
(45) Date of Patent: Jan. 24, 2023

(54) BATH WITH ELLIPTICAL AIR FLOW AND/OR MOVEABLE BOTTOM

(71) Applicant: LG ELECTRONICS INC., Seoul (KR)

(72) Inventors: Hyunsun Yoo, Seoul (KR); Myongsun Kim, Seoul (KR); Sungkyung Kim, Seoul (KR); Joogyeom Kim, Seoul (KR); Yousook Eun, Seoul (KR); Jaehung Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/552,588

(22) Filed: Dec. 16, 2021

(65) Prior Publication Data

US 2022/0104662 A1    Apr. 7, 2022

Related U.S. Application Data

(62) Division of application No. 16/594,345, filed on Oct. 7, 2019, now Pat. No. 11,229,327.

(Continued)

(30) Foreign Application Priority Data

Feb. 27, 2019    (KR) .................. 10-2019-0023280

(51) Int. Cl.
*A47K 3/02*     (2006.01)
*A01K 13/00*    (2006.01)
*A61H 33/00*    (2006.01)

(52) U.S. Cl.
CPC .............. *A47K 3/02* (2013.01); *A01K 13/001* (2013.01); *A61H 33/0087* (2013.01)

(58) Field of Classification Search
CPC .......... E03C 1/23; E03C 1/22; A01K 13/001; A61H 33/0087; A47K 3/02
(Continued)

(56) References Cited

U.S. PATENT DOCUMENTS 634,486 A    10/1899  Vanderman
843,968 A *   2/1907  Sharp ........................ E03C 1/23
                                                4/694

(Continued)

FOREIGN PATENT DOCUMENTS

CN    107912325      4/2018
JP    H 02-276516    11/1990
(Continued)

OTHER PUBLICATIONS

Chinese Office Action issued in Application No. 201910962230.9 dated May 14, 2021.

(Continued)

*Primary Examiner* — Benjamin R Shaw
(74) *Attorney, Agent, or Firm* — Ked & Associates

(57) ABSTRACT

A pet bath may include a tub, a cover connected to an upper rim of the tub, a jet provided in the tub to discharge bubbles, an air outlet provided in the tub to discharge air, and a sterilizer to sterilize the tub. The tub may have a bottom plate that is raised and lowered relative to a bottom frame having a drain and a filter assembly so that liquid in the tub flows between edges of the bottom plate and an inner surface of the tub toward the bottom frame to be drained and filtered.

18 Claims, 8 Drawing Sheets

Related U.S. Application Data

(60) Provisional application No. 62/744,296, filed on Oct. 11, 2018.

(58) Field of Classification Search
USPC .......................................................... 4/564.1
See application file for complete search history.

(56) References Cited

U.S. PATENT DOCUMENTS

| | | | | |
|---|---|---|---|---|
| 955,456 | A * | 4/1910 | Geurink | E03C 1/23 4/690 |
| 1,148,456 | A * | 7/1915 | Kenney | E03C 1/23 4/692 |
| 1,175,454 | A | 3/1916 | Keller | |
| 1,366,734 | A | 1/1921 | Koehler | |
| 1,704,510 | A * | 3/1929 | Muend | E03C 1/2302 4/685 |
| 1,724,147 | A | 8/1929 | Russell | |
| 1,758,226 | A * | 5/1930 | Kaufman | E03C 1/2302 251/75 |
| 2,017,416 | A * | 10/1935 | Mallet | E03C 1/2302 4/651 |
| 2,139,942 | A * | 12/1938 | Fellipone | A47K 3/02 34/239 |
| 2,504,561 | A | 4/1950 | Mcmillan | |
| 2,534,147 | A * | 12/1950 | Rodman | A47K 3/02 4/592 |
| 2,910,704 | A * | 11/1959 | Ashby | E03C 1/23 4/685 |
| 3,106,723 | A | 10/1963 | Carpenter | |
| 3,935,600 | A | 2/1976 | Scribner | |
| 3,955,221 | A | 5/1976 | Finch | |
| 4,128,904 | A | 12/1978 | Ekman | |
| 4,316,433 | A * | 2/1982 | Hebert | A01K 13/001 119/673 |
| 4,720,877 | A * | 1/1988 | Watts | E03C 1/22 4/286 |
| 4,727,604 | A * | 3/1988 | Petursson | E03C 1/2302 4/286 |
| 5,007,121 | A | 4/1991 | Mceathron | |
| 5,076,310 | A * | 12/1991 | Barenburg | E04B 2/82 137/15.08 |
| 5,243,931 | A | 9/1993 | Mcdonough | |
| 5,267,360 | A | 12/1993 | Bassi | |
| 5,341,820 | A * | 8/1994 | Hammett | A61H 33/00 4/564.1 |
| 5,448,966 | A | 9/1995 | Mckinnon | |
| 6,138,290 | A * | 10/2000 | Lin | A47K 1/14 4/293 |
| 6,405,387 | B1 | 6/2002 | Barnes | |
| 6,418,570 | B1 * | 7/2002 | Ball | E03C 1/22 4/295 |
| 6,681,420 | B1 * | 1/2004 | Ball | E03C 1/24 4/680 |
| 6,688,257 | B2 | 2/2004 | Lee | |
| 6,851,133 | B1 | 2/2005 | Nehring | |
| 7,329,343 | B1 | 2/2008 | Barnes | |
| 7,875,173 | B1 | 1/2011 | Barnes | |
| 9,879,473 | B1 | 1/2018 | Little | |
| 10,143,182 | B1 | 12/2018 | Ferro | |
| 2004/0226085 | A1 * | 11/2004 | Wang | E03C 1/23 4/295 |
| 2005/0116062 | A1 | 6/2005 | Yang | |
| 2005/0132488 | A1 | 6/2005 | Biondo | |
| 2007/0039559 | A1 | 2/2007 | Foster | |
| 2007/0079766 | A1 | 4/2007 | Park | |
| 2007/0214732 | A1 * | 9/2007 | Tzaig | E03F 5/046 52/19 |
| 2008/0041839 | A1 | 2/2008 | Tran | |
| 2008/0115264 | A1 | 5/2008 | Gamracy | |
| 2009/0139025 | A1 * | 6/2009 | Vogel | A47K 1/14 4/293 |
| 2010/0223721 | A1 | 9/2010 | May | |
| 2011/0017147 | A1 | 1/2011 | Petruzzi | |
| 2011/0061602 | A1 | 3/2011 | Moharram | |
| 2011/0072575 | A1 | 3/2011 | Cao | |
| 2011/0185494 | A1 * | 8/2011 | Beck | E03C 1/2302 4/689 |
| 2011/0297103 | A1 * | 12/2011 | Iou | A01K 13/001 119/676 |
| 2012/0048209 | A1 | 3/2012 | Tarbutton | |
| 2012/0324641 | A1 * | 12/2012 | Seri | E04H 4/14 4/496 |
| 2016/0374897 | A1 | 12/2016 | Carey | |
| 2018/0092790 | A1 | 4/2018 | Macbeth | |
| 2018/0263426 | A1 * | 9/2018 | Ahuja | E03C 1/2306 |
| 2019/0167043 | A1 * | 6/2019 | Beck | A47K 1/14 |
| 2020/0100464 | A1 * | 4/2020 | Kim | A01K 13/001 |
| 2020/0100465 | A1 * | 4/2020 | Kim | A01K 13/001 |
| 2020/0100466 | A1 * | 4/2020 | Kim | A01K 13/001 |
| 2022/0079389 | A1 * | 3/2022 | Fang | A61H 33/6068 |

FOREIGN PATENT DOCUMENTS

| | | |
|---|---|---|
| JP | H 11-299382 | 11/1999 |
| JP | 2007-104913 | 4/2007 |
| KR | 10-2007-0008860 | 1/2007 |
| KR | 10-1395421 | 5/2014 |
| KR | 10-1525934 | 6/2015 |
| WO | WO 2005/077156 | 8/2005 |

OTHER PUBLICATIONS

European Search Report dated Jan. 14, 2020 issued in Application No. 19202663.1.

U.S. Notice of Allowance dated Sep. 30, 2021 issued in U.S. Appl. No. 16/594,345.

U.S. Ex Parte Quayle Office Action dated Jul. 29, 2021 issued in U.S. Appl. No. 16/594,345.

U.S. Office Action dated Feb. 4, 2021 issued in U.S. Appl. No. 16/594,345.

Chinese Office Action dated Nov. 15, 2022 issued in Application No. 202210113292.4 (English translation attached).

* cited by examiner

BATH WITH ELLIPTICAL AIR FLOW AND/OR MOVEABLE BOTTOM

CROSS-REFERENCE TO RELATED APPLICATION(S)

This application is a Divisional of U.S. patent application Ser. No. 16/594,345, filed on Oct. 7, 2019, which claims priority under 35 U.S.C. § 119 to U.S. Provisional Application No. 62/744,296 filed on Oct. 11, 2018 and Korean Application No. 10-2019-0023280 filed on Feb. 27, 2019, whose entire disclosures are hereby incorporated by reference.

BACKGROUND

1. Field

The present disclosure relates to a bath that may bathe and dry a pet.

2. Background

The population of households raising pets is steadily increasing. Pets usually live at home with people and require regular bathing and cleaning to remove bacteria and other debris.

There is a need for a pet bath tub that may effectively drain the water in the tub and effectively clean the tub after bathing, and a need for a pet bath tub that allows a pet owner to conveniently wash and dry a pet. There is also a need for the development of a device capable of conveniently and efficiently bathing, drying, sterilizing, and/or grooming pets.

BRIEF DESCRIPTION OF THE DRAWINGS

The embodiments will be described in detail with reference to the following drawings in which like reference numerals refer to like elements wherein.

DETAILED DESCRIPTION

Figure 1:
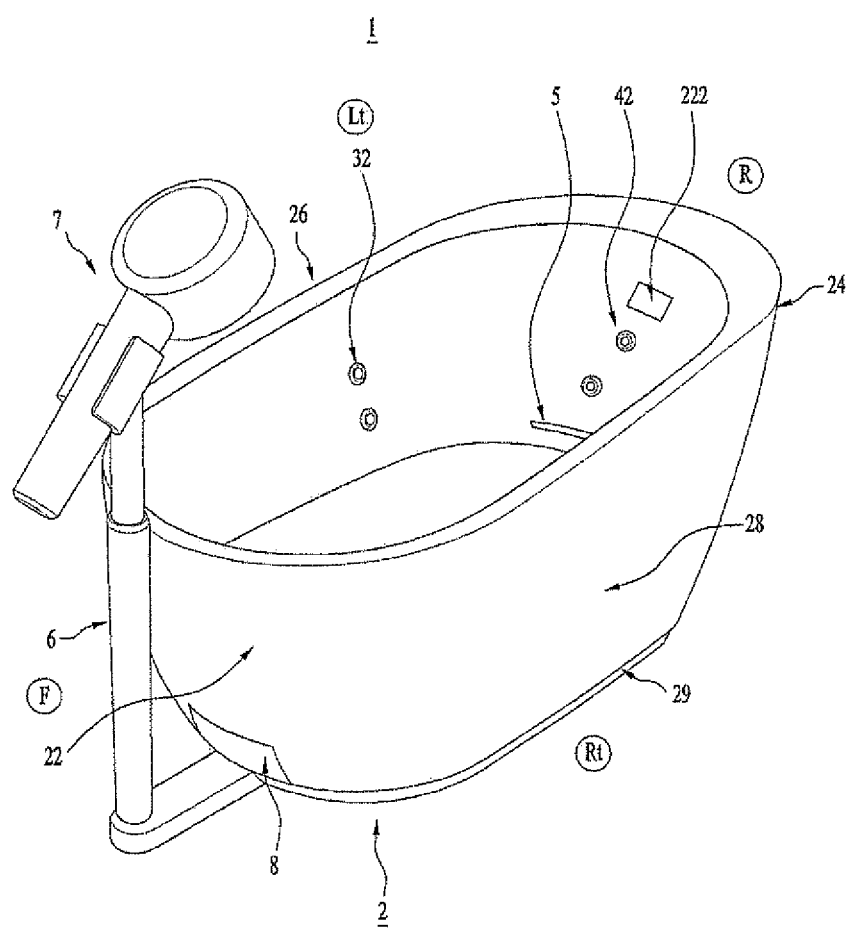
FIG. 1 is a perspective view showing an embodiment of a tub according to an embodiment.

Referring to FIG. 1, a bathtub or tub assembly 1 (e.g., a pet bathtub) may include a tub or basin 2 to hold or contain an item or a pet to be bathed and dried in the tub 2. The tub 2 may also store liquid or water to bathe the pet. The tub 2 may also be referred to as a container, chamber, or tank.

A shape and size of the tub 2 is not limited so long as the tub 2 may hold a pet and liquid to wash the pet. For example, the tub 2 may include an upper opening formed by a sidewall and a bottom surface on the bottom of the sidewall. As an example, the tub assembly 1 may have a length of approximately 680 mm or 2-3 feet, a width of approximately 350 mm or 1-2 feet, and a height of approximately 350 mm or 1-2 feet. However, dimensions of the tub assembly 1 are not limited thereto. A cross-section of the tub 2 may be square, polygonal, elliptical, circular, oval, or resemble a stadium shape (i.e., two straight sides connected by semicircular sides). An inside of the tub 2 may be provided with an overflow hole 222 to prevent water or liquid in the tub from overflowing outside of the tub. The tub 2 may be configured to be portable and/or lightweight, and may be configured to connect to external water supply sources and external drains.

The bathtub 1 may include a faucet or showerhead 7 that may spray water on the pet when the pet is inside the tub 2. The faucet 7 may also be referred to as a dispenser. A faucet holder 6 to support the faucet 7 may be provided. The faucet holder 6 may be rotatably supported by the tub 2, and the faucet 7 may be tilted and detachably supported by the faucet holder 6.

For convenience of explanation, a front F may be opposite to a rear R, and a left Lt may be opposite to a right Rt. The faucet 7 and faucet holder 6 may be provided at the front F of the tub 2, but embodiments disclosed herein are not limited to a position of the faucet 7 and faucet holder 6.

The tub 2 may include a front wall 22, a rear wall 24, a left wall or first sidewall 26, a right wall or second sidewall 28, and a bottom wall or rim 29. The left wall 26 and the right wall 28 may be configured to be longer than the front wall 22 and the rear wall 24. The front wall 22, rear wall 24, left wall 26, and right wall 28 may define an upper opening of the tub 2, and the bottom wall 29 may extend from lower ends of the front, rear, left, and right walls 22, 24, 26, and 28 to a ground surface. An outer cross-section of the tub 2 may be smaller at the bottom wall 29 than at bottom ends of the front, rear, left, and right walls 22, 24, 26, and 28. The bottom wall 29 may be a solid plate or base below the front, rear, left, and right walls 22, 24, 26, and 28, or alternatively may be a vertical wall or shell having a hollow inner space. A bottom of an inner space or washing space of the tub 2 may be defined by a bottom plate 92.

A first outlet or jet 32 may be provided inside the left and right walls 26 and 28 to discharge jet streams, air, or bubbles (e.g., micro bubbles) into the tub 2. The jet 32 may also be referred to as a bubble outlet. Bacteria or debris on the pet's skin or fur may be removed by the bubbles discharged from the jet 32 when the pet is bathed. A shape and position of the jet 32 are not limited. For example, at least one jet may be provided at centers of the left and right walls 26 and 28 of the tub 2, and each jet 32 may be formed to have a circular outlet communicating with an inner space or washing space of the tub 2. The number of jets 32 is not limited. Each jet 32 may be provided at a height that is lower than a height of the overflow hole 222.

A second outlet or jet 42 through which air is discharged may be provided inside the tub 2. When the pet is dried, the pet may be effectively dried by air discharged from the second outlet 42. The second outlet 42 may also be referred to as an air outlet. A shape and position of the air outlet are not limited. For example, at least one air outlet 42 but may be provided at centers of the front and rear walls 22 and 24 of the tub 2. The number of air outlets 42 is not limited. Each air outlet 42 may be provided at a height that is lower than a height of the overflow hole 222.

A sterilizing device or sterilizer 5 capable of sterilizing bacteria may be provided to face the inner space of the tub 2. The sterilizer 5 may sterilize germs on the pet, in the water, and/or in the tub 2. The sterilizer 5 may include at least one ultraviolet light emitting diode (UV LED). The UV LED may emit light configured to kill bacteria and certain microorganisms. As an example, the UV LED may emit UVC light having a wavelength between 220 and 280 nm.

A shape and position of the sterilizer 5 are not limited. For example, at least one sterilizer 5 may be provided at a lower portion of at least one of the front or rear walls 22 and 24 of the tub 2. A length of the sterilizer 5 may be smaller than a width of the tub 2 and/or lengths of the front and rear walls 22 and wall 24. The sterilizer 5 may be provided below the air outlet 42. A number of sterilizers 5 is not limited.

Figure 2:
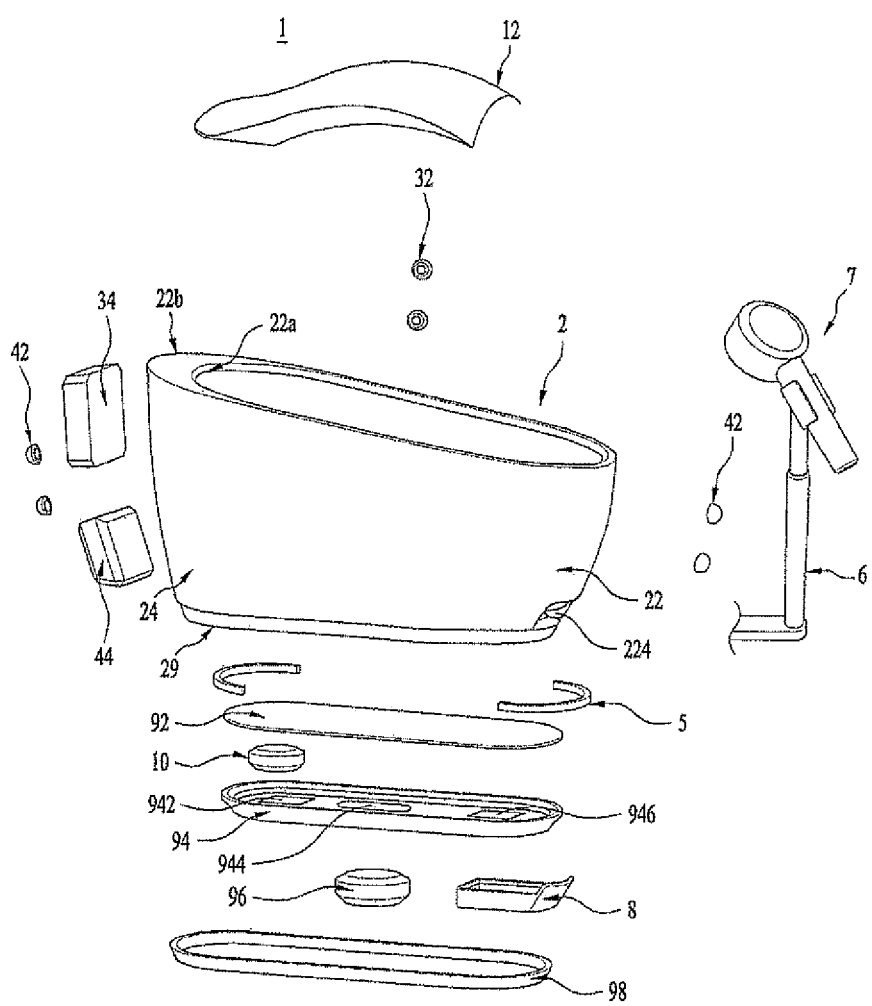
FIG. 2 is an exploded perspective view of FIG. 1.

With reference to FIGS. 1 and 2, the tub 2 may house a pet and receive water from the faucet 7 during bathing. The tub 2 may be formed as a container to store liquid and having an upper opening. The upper opening of the tub 2 may not have a constant height. For example, a height of the rear wall 24 may be greater than a height of the front wall 22 to create a sloped upper opening. A height of the faucet holder 6 may be greater than a height of the front wall 22, and the faucet 7 may be positioned to fill liquid into the tub 2 through the upper opening.

A cover or lid 12 may be provided at the upper opening of the tub 2. The cover 12 may be removable or detachable from the upper opening of the tub 2. Alternatively, and end of the cover 12 may be fixed to the tub 2, and the cover 12 may be retractably opened or closed. The cover 12 may serve to partially cover the upper opening of the tub 2 in storage, and may also assist in directing an air flow for drying a pet inside of the tub 2.

An outer side of at least one wall (e.g., the front wall 22) of the tub 2 may be provided with a recess or cavity 224. The recess 224 may form a space in which a removable filter assembly 8 may be inserted. The filter assembly 8 may filter foreign matter such as pet hair when discharging or draining the water of the tub 2 to an outside of the tub. Details of the filter assembly 8 will be described in more detail with reference to FIGS. 6-7.

The front wall 22, the rear wall 24, the left wall 26, and the right wall 28 of the tub 2 may form a sidewall. The sidewall of the tub 2 may be formed by an inner wall 22a and an outer wall 22b. An intermediate space may be formed between the inner wall 22a and the outer wall 22b. Various devices may be provided or installed in the intermediate space.

The jet 32, the air outlet 42, and the sterilizer 5 may be provided on or exposed through openings of the inner wall 22a. A bubble or jet generator 34 and an air compressor 44 may be provided in the intermediate space between the inner wall 22a and the outer wall 22b.

The bubble generator 34 may be a device that generates bubbles or microbubbles. The bubble generator 34 may generate bubbles in a tub 2 filled with liquid by blowing air into the liquid of the tub 2 (e.g., via an air jet 32), or alternatively by discharging water or liquid into the liquid of the tub 2 (e.g., via a water jet 32). As another alternative, the bubble generator 34 may be configured to discharge soap via the jet 32. A passage or flow path between the bubble generator 34 and the jet 32 may be provided in the intermediate space. A plurality of bubble generators 34 may be provided. For example, a first bubble generator 34 may connect to a jet 32 on the left wall 26 and a second bubble generator may connect to a jet 32 on the right wall 28.

The air compressor 44 may be a device to generate or compress air. An air flow path or passage may be formed between an outlet of the air compressor 44 and the air outlet 42. The air outlet 42 may be provided in the intermediate space, and an end or outlet of the air outlet 42 may be exposed through an opening of the inner wall 22a to communicate with the inner space of the tub 2. A heater to heat air may be provided at a predetermined position of the air flow path.

A bottom frame 94 may be provided below the bottom plate 92 of the tub 2 and above the bottom wall 29. The bottom frame 94 may have a cross-section that substantially corresponds to a cross section of the tub 2.

The bottom frame 94 may contact the inner wall 22a of the tub 2 to prevent water inside the tub 2 from leaking to the outside. A lower portion of the inner wall 22a of the tub 2 may be provided with a protrusion or flange 2a (FIG. 7) protruding inward from the inner wall 22a. An outer edge or rim 94a (FIG. 7) of the bottom frame 94 may be seated on and/or inserted onto the protrusion 2a. Details of the protrusion 2a will be described with reference to FIG. 7. The bottom frame 94 may have a flat surface and a sidewall that extends above the flat surface. An upper end of the sidewall may include the outer edge 94a of the bottom frame 94.

The bottom plate 92 may be provided above the bottom frame 94. The bottom plate 92 may also be referred to as a base plate 92. The bottom plate 92 may be configured to move or slide toward and away from the bottom frame 94 (i.e., vertically or up and down). When the bottom plate 92 is at a lowermost position, the bottom plate 92 may contact the outer edge 94a of the bottom frame 94 (FIG. 7) and may further serve to prevent water inside the tub 2 from leaking to the outside. An edge of the bottom plate 92 may include or be coated with an elastic material (e.g., rubber) or include a gasket to further prevent leakage by sealing the bottom plate 92 within the bottom frame 94 to be watertight.

A cross-sectional shape of the bottom plate 92 may correspond to a cross-sectional shape defined by the upper edge 94a (FIG. 7) of the bottom frame 94. The inner wall 22a may have a cross-sectional area that increases from a bottom to a top.

The cross-sectional area of the inner wall 22a at the bottom may be greater than or equal to a cross-sectional area of the bottom plate 92. When the bottom plate 92 is moved upward, a space may be formed between the bottom plate 92 and the bottom frame 94 and also between the bottom plate 92 and the inner wall 22a, and liquid inside the tub 2 may flow between an edge of the bottom plate 92, the inner wall 22a, and the outer edge 94a of the bottom frame 94 into the space and ultimately out of the tub 2.

The bottom frame 94 may be provided with a motor recess or opening 944 in which a motor 96 may be mounted. The motor 96 may be connected to the bottom plate 92 to move the bottom plate 92 up and down. The motor 96 may include a shaft that rotates, and a motion converter 96a (FIG. 8B) may be provided between the shaft of the motor 96 and the bottom plate 92 to convert a rotational motion of the motor 96 into a vertical motion. A case of the motor 96 may be configured to be watertight.

The motion converter 96a may be a known mechanism to change rotation motion to linear motion such as a lead screw, a ball screw, or a rack and pinion gear mechanism. For example, a lead screw may be connected to the shaft of the motor 96. A hole or recess having a nut may be provided in the bottom plate 92, and the lead screw may be inserted into the nut. When the motor is rotated, the lead screw may rotate to be inserted into and out of the nut, changing a distance between the motor 96 in the bottom frame 94 and the bottom plate 92.

Alternatively or in addition thereto, the case of the motor 96 may have an adjustable height to assist in raising and lowering the bottom plate 92. The case may be made of an elastic material, and may expand or contract when the bottom plate 92 is raised and lowered.

The motor recess 944 may be recessed downward and may be provided at a center of the bottom frame 94. Alternatively, the motor recess 944 may be an opening. The motor 96 may be configured such that, when the motor 96 is inserted into the motor recess 944, a coupling between the motor 96 and the motor recess 944 is watertight.

The bottom frame 94 may be provided with a fan recess or opening 942 in which a fan or propeller 10 is mounted. The fan 10 may not be a regular air fan but instead be configured to change a flow of water (e.g., in a swirling, whirlpool, or rotating motion), and the term "fan" may be a term for convenience to describe a device that swirls water and/or guides a flow of water inside the tub 2. When the bottom plate 92 is spaced apart from the bottom frame 94 and water is introduced therebetween, the inner wall of the tub 2 may be cleaned by moving or rotating water, which may be guided or rotated by the fan 10. The fan 10 may use a waterproof fan (see FIG. 8). The fan recess 942 may be recessed or penetrated downward, and may be provided at a side of the bottom frame 94.

The bottom frame 94 may be provided with a discharge portion or drain 946 to discharge or drain water, liquid, and/or other waste of the tub 2. The drain 946 may also be referred to as a water outlet or discharge port. The drain 946 may be a hole or opening. Water introduced between the bottom plate 92 and the bottom frame 94 may be discharged to the outside of the bottom frame 94 through the drain 946. The drain 946 may be provided on a side of the bottom frame 94 that is opposite to a side where the fan recess 942 is provided.

The filter assembly 8 may be provided below the drain 946. Water and other waste in the tub 2 may flow to the filter assembly 8 through the drain 946 of the bottom frame 94. Hair, dander, and other solid waste may be filtered in the filter assembly 8, while liquid filtrate is discharged to the outside of the tub 2. The drain 946 and filter assembly 8 will be described in more detail with reference to FIG. 6.

An outer frame 98 may be provided below the tub 2 to support the tub and prevent the tub 2 from slipping. The outer frame 98 may be provided below the bottom wall 29 and bottom frame 94, or alternatively may surround at least one of the bottom frame 94 and the bottom wall 29. The outer frame 98 may be made of an elastic material (e.g., rubber) or a sturdy material (e.g., metal) configured to prevent slipping and support a weight of the tub 2 and a pet inside of the tub 2. The bottom plate 92, the bottom frame 94, the filter assembly 8, and the outer frame 98 may form a base of the tub 2, and the fan 10 and motor 96 may be provided in the base. Positions of the bottom plate 92, bottom frame 94, filter assembly 8, outer frame 98, fan 10, and motor 96 are not limited. As an alternative example, the bottom plate 92 may be provided below the bottom frame 94, and may be raised to seal the bottom frame 94 and lowered to drain the tub 2. As another alternative, the bottom plate 92 may slide laterally under or above the bottom frame 94 to seal the bottom frame 94 and drain the tub 2. The bottom wall 29 may be optional, and the bottom frame 94 may be a bottom of the tub 2. As another alternatively, the bottom wall 29 may have an opening in which the bottom frame 94 is inserted, and the bottom frame 94 may contact the ground or floor.

Figure 3:
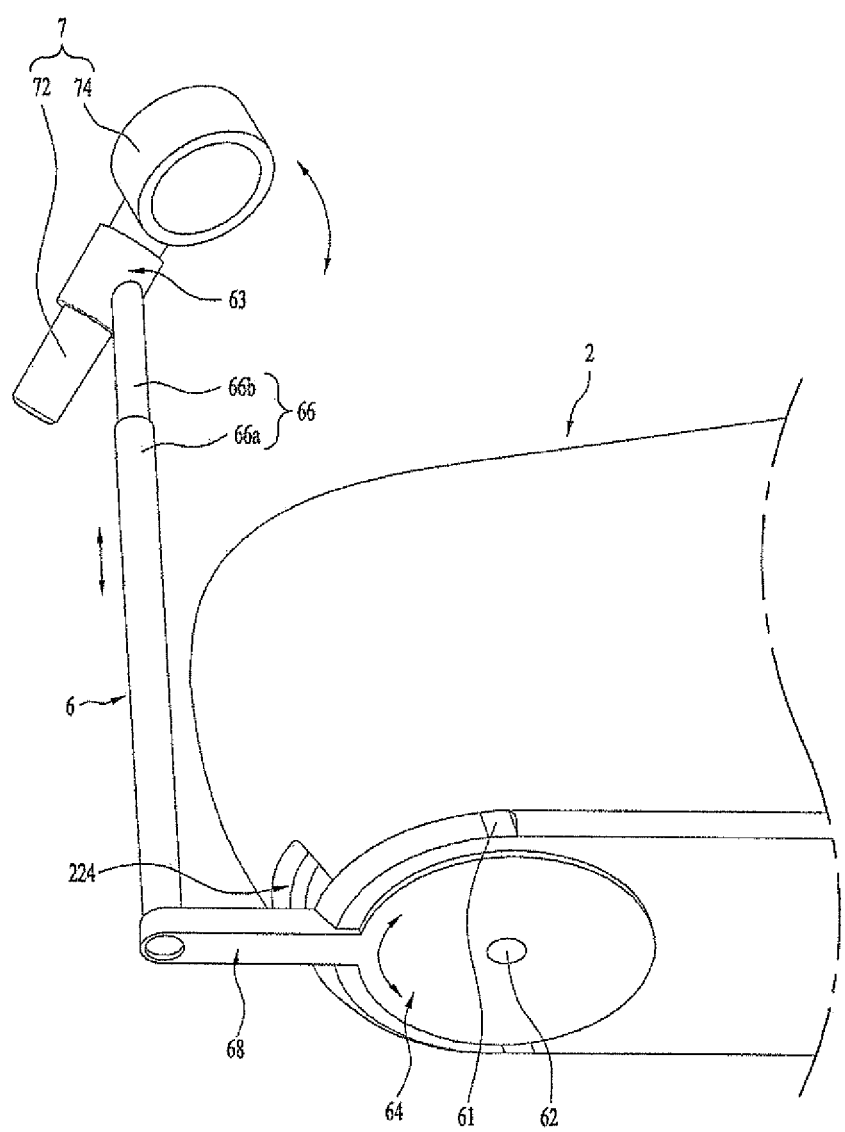
FIG. 3 is a partial perspective view of a faucet holder and the faucet of FIG. 1.

With reference to FIG. 3, the faucet holder 6 may be rotatably connected to the tub 2. The faucet holder 6 may include a tub coupling portion or holder base 64, a height adjustment portion or assembly 66, and a faucet support 63. The holder base 64 may also be referred to as a rotational base.

A rotary shaft 62 may extend from the bottom surface of the tub 2 (i.e., a bottom surface of the bottom frame 94), and the holder base 64 may have be rotatably coupled to the rotary shaft 62. The shape of the holder base 64 is not limited. As an example, the holder base 64 but may include a circular plate having a large area so as to be stably supported, and the circular plate may have a hole or recess in which the rotary shaft 62 is inserted. An arm 68 may extend from a side of the circular disc to the outside of the tub 2.

The height adjustment portion 66 may be a longitudinal portion of the faucet holder 6 configured to raise and support the faucet 7 above the upper opening of the tub 2. The height adjustment portion 66 may an adjustable height or vertical length. The height adjustment portion 66 may include two concentric pipes 66a and 66b that are insertably coupled. As an example, an inner pipe 66b may be a cylindrical pipe that is inserted into an outer pipe 66a, which may be a cylindrical shell. The inner pipe 66b may slide up and down relative to the outer pipe 66a to adjust an overall height of the height adjustment portion 66. Alternatively, pipe 66b may be an outer pipe having a cylindrical shell structure that is inserted onto a pipe 66a, which may be an inner pipe.

There may be an optional locking mechanism to fix a position of the inner pipe 66b in the outer pipe 66a; alternatively, a frictional force between the inner pipe 66b and outer pipe 66a may be sufficient to keep the inner pipe 66b at a set height, and a user may apply a force to raise and lower the inner pipe 66b. As another alternative, there may be an optional motor or actuator (e.g., linear actuator) provided to automatically raise and lower the inner pipe 66b via a remote controller, switch, or other user interface device.

An upper end of the inner pipe 66b may include the faucet support 63 to support and secure the faucet 7. The faucet 7 may include a shower or faucet head 74 and a water pipe or handle 72 to supply water or washing liquid. The shower head 74 may be coupled to a first end of the water pipe 72, and a second end of the water pipe 72 may be connected to a water supply source, for example, an external or commercial faucet, sink, bathtub, or hose. An optional flexible pipe or hose may be provided to couple the second end of the water pipe 72 with the water supply source.

A weight and material of the tub 2 may be configured so that the tub 2 may be carried by a user to the water supply source before bathing and carried to a storage location after drying. For example, the inner and outer walls 22a and 22b, the bottom wall 29, and the bottom plate 92 and bottom frame 94 may be made of a lightweight metal, or alternatively a rigid plastic. Materials of the inner and outer walls 22a and 22b, the bottom wall 29, and the bottom plate 92 and bottom frame 94 are not limited thereto.

The shower head 74 may be configured to spray at least one stream of liquid via at least one through hole, and may be configured to have an adjustable water or liquid pressure. The shower head 74 may include electronic devices to change a pressure or output pattern (e.g., pulse or spray pattern) of the liquid ejected from the shower head 74, and may include a user interface (e.g., a button) to control the output of the liquid from the shower head 74. For example, the shower head 74 may output a pulsating stream of liquid, a continuous spray, or a concentrated stream of liquid.

The water pipe 72 may be seated on and supported by the faucet support 63. The faucet support 63 may have a shape or contour that corresponds to an outer shape or contour of the faucet support. For example, the faucet support 63 may be a cylindrical shell or partial cylindrical shell, and the water pipe 72 may have a cylinder shape with a cross-sectional diameter corresponding to a cross-sectional diameter of the faucet support 63. The water pipe 72 may be lifted and removed from the faucet support 63, and a user may grasp the water pipe 72 to bring the shower head 74 closer to the pet or to the inner wall 22*a* of the tub 2 for washing or cleaning.

The faucet support 63 may tilt or pivot with respect to the upper end of the inner pipe 66*b*. The faucet support 63 may be configured to have a changing orientation so that a user may point the faucet support 63 upward, downward, or to a side toward a pet in the tub 2. The faucet support 63 and upper end of the height adjustment portion 66 may have a known tilting structure (e.g., an internal flexible or elastic hose, a ball and socket joint, etc.), and a detailed description thereof will be omitted.

Accordingly, the user may adjust an orientation of the faucet 7 by adjusting an orientation of the faucet support 63. The user may also adjust a position of the faucet 7 via a rotation or pivoting of the holder base 64.

For example, the holder base 64 of the faucet holder 6 may be rotated clockwise or counterclockwise via the rotary shaft 62. At least one of the bottom wall 29 and outer frame 98 may have a cut portion to allow the arm 68 to pivot according to a rotation of the holder base 64. Alternatively, the arm 68 and holder base 64 may be provided completely under the bottom surfaces of the bottom frame 94, outer frame 98, and bottom wall 29 so that the bottom frame 94, outer frame 98, and bottom wall 29 do not restrict a rotation of the arm 68. Since a bottom end of the height adjustment portion 66 may be fixed to an outer end of the arm 68, the height adjustment portion 66 may also rotate or pivot to the left and right of the tub 2 via a rotation of the holder base 64 around the rotary shaft 62.

A user may manually rotate the faucet holder 6 by gripping the height adjustment portion 66. Alternatively, there may be a motor or actuator provided to automatically rotate the rotary shaft 62, which may be controlled remotely or via a user interface device. A stopper 61 may be provided in the cut portion of the bottom wall 29 and/or the outer frame 98 to prevent the rotation of the arm 68 and therefore the holder base 64 past a certain predetermined rotation angle. The stopper 61 may be formed by an end of the cut portion, and may optionally include an elastic material (e.g., rubber).

Alternatively, when the holder base 64 and arm 68 are provided completely under the bottom frame 64, bottom wall 29, and outer frame 98, the stopper 61 may be a protrusion extending below a bottom surface of at least one of the bottom frame 64, the bottom wall 29, and the outer frame 98 to prevent a further rotation of the arm 68 and therefore the holder base. As another alternative, a portion of the bottom wall 29 and/or the outer frame 98 provided above or around the holder base 64 and arm 68 may be configured to be rotatable, and the portion of the bottom wall 29 and/or the outer frame 98 may rotate when the arm 68 rotates.

A rotation angle of the faucet holder 64 and arm 68 may be 90 degrees clockwise and counterclockwise from a center or initial position, respectively, so that a range of rotation of the faucet holder 64 and arm 68 may be 180 degrees. However, the range of rotation is not limited to 180 degrees. The stopper 61 may be provided on an outer surface of the tub 2 (e.g., outer surface of the front wall 22, bottom wall 29, or outer frame 98), so that when the holder base 64 is rotated by a maximum rotation angle, the arm 68 of the faucet holder 6 touches the stopper 61 so that no further rotation occurs.

A position of the faucet 7 may be adjusted laterally via the rotation of the holder base 62 and vertically via the height adjustment portion 66, and an orientation of the faucet 7 may be adjusted via a tilting or pivoting of the faucet support 63. A rotation angle of the holder base 64 of the faucet holder 6, an extension height of the height adjustment portion 66, and a tilting angle of the faucet support 63 are not limited and may be appropriately determined.

Figure 4:
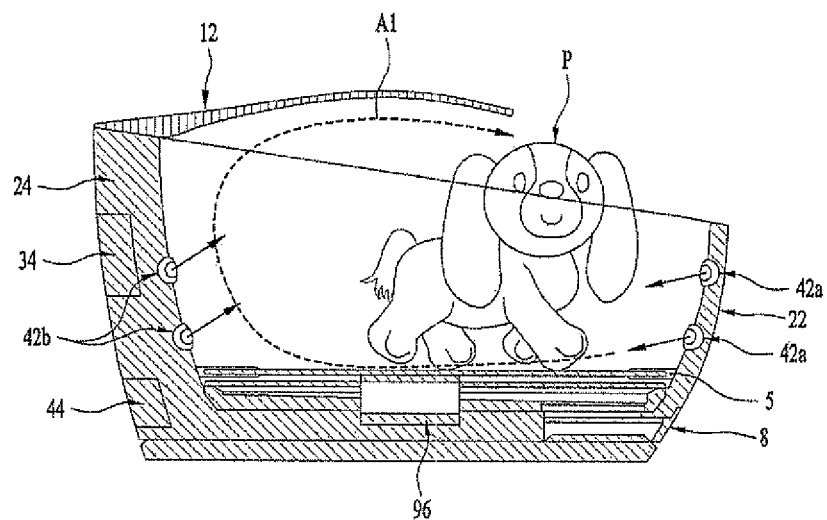
FIG. 4 is a cross-sectional view of FIG. 1.

With reference to FIG. 4, a cover 12 may be provided at the upper opening of the tub 2. The cover 12 may be attached to an upper surface on the tub 2 (e.g. an upper surface of the rear wall 24), and may be removed. The cover 12 may couple to an engaging portion or structure of the tub 2 by a known coupling means (e.g., pressed-fit, snap fit, grooves and recesses, hinge, etc.) Alternatively or in addition thereto, the cover 12 may adhere to the upper surface of the rear wall 24. An optional seal or sealant may be provided between the cover 12 and the upper surface of the rear wall 24.

The cover 12 may be made with a transparent or translucent material (e.g., plastic) to reduce anxiety in a pet under the cover 12. A material of the cover 12 may be soft or elastic so that the cover 12 may close in a retractable manner. Alternatively or in addition thereto, a motor or drive may be provided to automatically open and retract the cover 12. In addition, materials of the cover 12 may be configured to withstand damage if a pet hits the cover 12 and to prevent damage during removal and attachment. Alternatively, the cover 12 may be formed of a rigid material, and may be lifted and removed from the tub 2. A size of the cover 12 may be configured to block approximately 60-70% of the upper opening of the tub 2. The cover 12 may not cover the entire upper opening of the tub 2 to prevent anxiety and fear of a pet being dried in the tub 2.

The cover 12 may have a shape configured to guide air discharged from the air outlets 42 to induce a flow of air that may efficiently dry a pet. For example, a bottom of the cover 12 may have a concave curvature. The cover 12 may be inclined upward from the upper surface of the rear wall 24 of the tub and then inclined downward from a position corresponding to a center of the upper opening of the tub 2.

The air outlets 42 may have an arrangement and position configured to induce the flow of air for efficient drying of the pet. When viewed from the side of the tub 2, positions of the air outlets 42 and the cover 12 may be configured such that, when the air outlets 42 discharge air, the air may have a circulating flow circulating from a bottom of the tub at the bottom plate 92 toward a top of the tub 2 at the cover 12 and above the upper opening.

The air outlets 42 may include at least one front air outlet 42*a* formed in the front wall 22 and at least one rear air outlet 42*b* formed in the rear wall 24. The front air outlet 42*a* may be configured to discharge air downward toward the bottom plate 92, and the rear air outlet 42*b* may be configured to discharge air upward so that air is discharged upward toward the cover 12. Alternatively, the cover 12 may be attached to an upper surface of the front wall 24, the rear air outlet 42*b* may be configured to discharge air downward toward the bottom plate 92, and the front air outlet 42*a* may be configured to discharge air upward so that air is discharged upward toward the cover 12.

A flow of air may be determined based on an inclination of discharge tubes or nozzles provided in the air outlets 42. For example, the front air outlet 42a may have a discharge tube or nozzle that is inclined or oriented downward from the front wall 22 toward the bottom plate 92, and the rear air outlet 42b may have a discharge tube or nozzle that is inclined or oriented upward from the rear wall 24 toward the cover 12. Such a configuration of the front and rear air outlets 42a and 42b may reduce or minimize an amount of air discharged to the outside of the tub 2.

Air flowing in the tub 2 during drying may circulate in a circular, elliptical, or cyclical pattern A1 from a bottom to a top, i.e. in the vertical direction, when viewed from a left or right side of the tub 2. Air flowing from a bottom of the tub 2 to a top is guided back to the tub 2, while an outflow of air is reduced or minimized by the cover 12. Therefore, it is possible to effectively dry both upper and lower portions of a pet P in the tub and minimize or reduce a loss of air.

Figure 5:
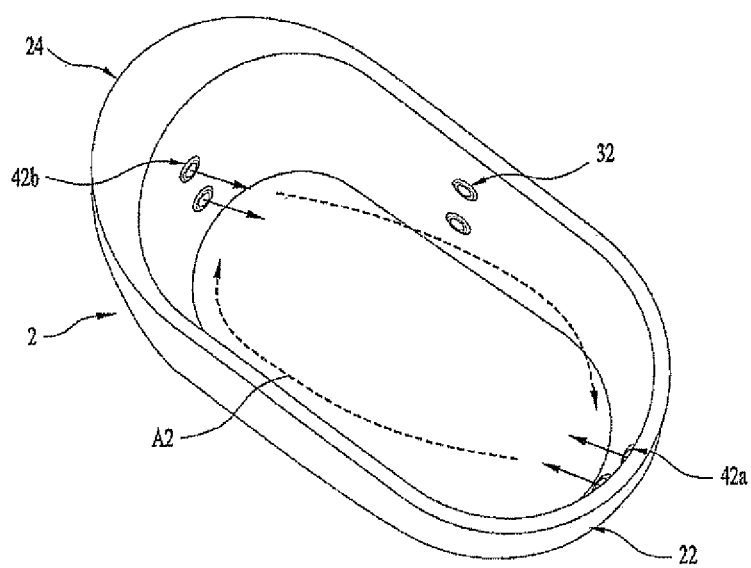
FIG. 5 is a perspective view of FIG. 1 showing a tub viewed from above.

As shown in FIG. 5, when the tub 2 is viewed from a top, the air may circulate in a circular, elliptical, or cyclical pattern A2 from one side (e.g., a left side) of the tub 2 to the other side (e.g., a right side) in a the horizontal or lateral direction. The front air outlets 42a may be configured to discharge air toward the left, and the rear air outlets 42b may be configured to discharge air toward the right. Alternatively, the front air outlets 42a may be configured to discharge air toward the right, and the rear air outlets 42b may be configured to discharge air toward the left. Discharge tubes or nozzles in the front air outlets 42a may be inclined or oriented both downward and leftward, and discharge tubes or nozzles in the rear air outlets 42b may be inclined or oriented both upward and rightward.

Air may flow along the left and right walls 26 and 28 of the tub 2, and both the left and right sides of the pet P may be dried effectively. The air of the air outlets 42 circulates in both lateral and vertical circles. By this circulation of air, air may generate vortices inside the tub 2 to dry the pet more efficiently. Alternatively or in addition thereto, when the bubble generator 34 is configured to blow air through the jets 32, air may also be blown through the jets 32 to further assist the drying of the pet on left and right sides.

Figure 6:
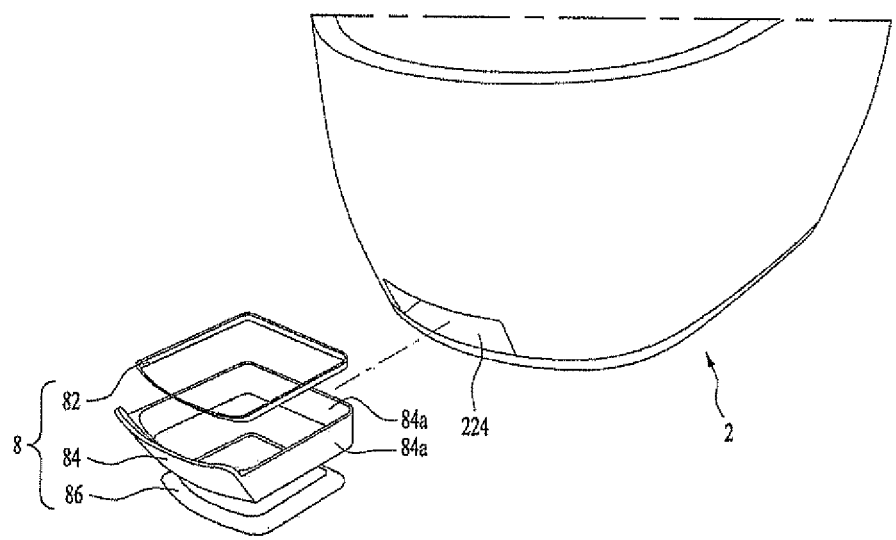
FIG. 6 is an exploded perspective view illustrating a filter assembly of FIG. 1.
Figure 7:
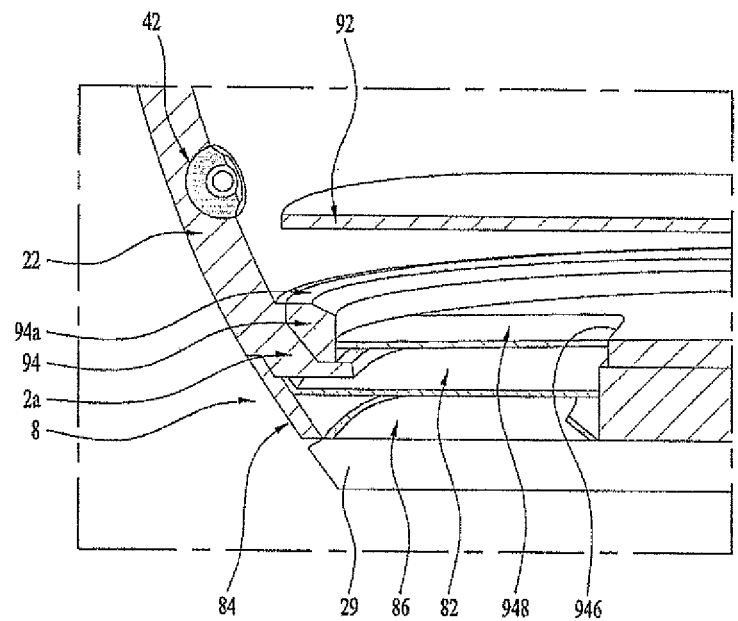
FIG. 7 is a partially cut perspective view illustrating a state in which the filter assembly of FIG. 6 is mounted on a tub.

Referring to FIGS. 6 and 7, a recess 224 may be provided in the front wall 22 of the tub 2, and the filter assembly 8 may be inserted into and pulled out of the recess 224. The filter assembly 8 may comprise a filter guide or tray 84 which may have an outer shape or contour corresponding to an inner shape or contour of the recess 224. The filter guide 84 may include a partition wall 84a configured to be vertical or inclined upward. The filter guide 84 may have an upper opening, and the partition wall 84a may define a chamber or cavity.

A filter 82 may be provided at an upper portion of the filter guide 84. A receiver or bottom filter 86 may be provided below the filter guide 84. The filter 82 and the receiver 86 may be, for example, a mesh filter, a strainer, a carbon filter, etc. Alternatively, the receiver 86 may be a receiving tray. FIG. 6 shows an example where the filter 82 is a mesh filter and the receiver 86 is a mesh filter or strainer. The filter 82, the filter guide 84, and the receiver 86 may be made of a rigid material (e.g., plastic or metal) configured to be washed in liquid. Alternatively or in addition thereto, the filter 82, filter guide 84, and the receiver 86 may be configured to be machine washable.

As shown in FIG. 7, when the filter assembly 8 is inserted into the recess 224 of the tub 2, the filter assembly 8 is positioned below the drain 946 of the bottom frame 94. A filter 948 may be installed or provided in an upper opening of the drain 946 of the bottom frame 94, and the filter 948 may be a mesh filter or strainer. The filter 948 may also be referred to as a first filter, the filter 82 may also be referred to as a second filter, and the receiver 86 may also be referred to as a third filter.

The filter 948 of the drain 946, the filter 82 of the filter assembly 8, and the receiver 86 may be filters having a plurality of through holes. The plurality of through holes of each of the filter 948 of the drain 946, filter 82 of the filter assembly 8, and the receiver 86 may have sizes configured to filter filtrate of a predetermined size, and the filter 948, filter 82, and receiver 86 may be sequentially arranged in order of filtrate size so that larger foreign matter is filtered first and smaller foreign matter is filtered last. As an example, the plurality of through holes of the filter 948 of the drain 946 may be larger than the plurality of through holes of the filter 82, which may be larger than the plurality of through holes of the receiver 86.

Figure 8A:
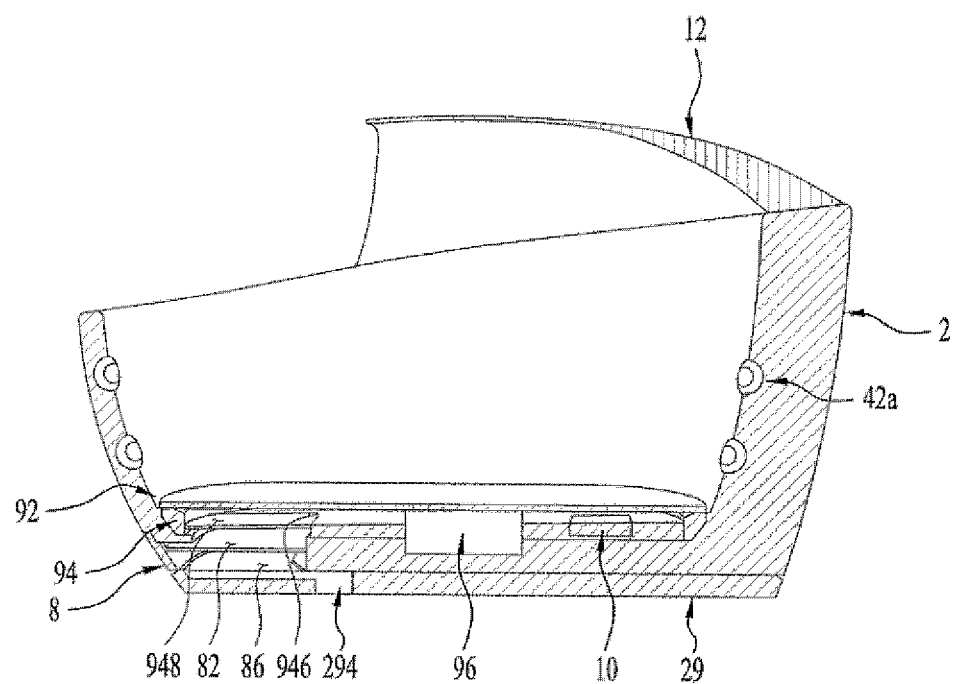
FIG. 8A is a longitudinal cross-sectional view of FIG. 1 showing a bathing process.
Figure 8B:
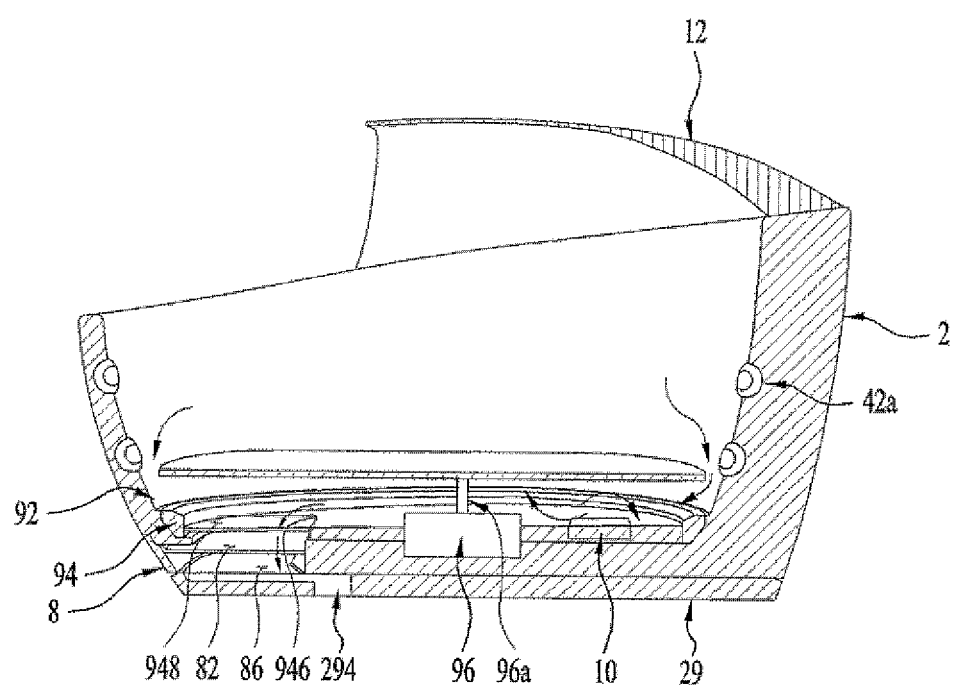
FIG. 8B is a longitudinal cross-sectional views of FIG. 1 showing a draining process.

Referring to FIGS. 8A and 8B, some of the through holes of the receiver 86 of the filter assembly 8 may be in communication with an opening of a drain 294 provided in the bottom wall 29 of the tub 2. Liquid flowing through the drain 294 of the bottom wall 29 may flow to an outside of the tub 2. The drain 294 may also be referred to as a final drain.

As shown in FIG. 8A, when the pet is bathed, a bottom of the bottom plate 92 may be in airtight contact with a top of the bottom frame 94. Water, liquid, and other material inside the tub 2 may not be discharged to the outside of the tub 2 when the bottom plate 92 is seated and in contact with the bottom frame 94.

As shown in FIG. 8B, when the bath of the pet is completed, the motor 96 may be operated to move the bottom plate 92 upward, and the bottom plate 92 may be spaced apart from the bottom frame 94 by a predetermined distance (e.g., 10 mm). The pet may be removed before the bottom plate 92 is lifted. Alternatively, the bottom plate 92 and motion converter 96a of the motor (e.g., lead screw mechanism) may be configured to support a pet so that the bottom plate 92 may be lifted while the pet is still in the tub 2.

Liquid and waste inside the tub 2 may flow toward the bottom frame 94 through a gap between an edge of the bottom plate 92 and the edge 94a of the bottom frame 94. Liquid and waste introduced into the bottom frame 94 may flow to the drain 946 and through the filter assembly 8 of the bottom frame 94. Water passing through the filter assembly 8 may be discharged to the outside of the tub 2 through the drain 294 of the bottom wall 29. The drain 294 may include a portion that at least partially aligns with the drain 946 of the bottom plate 94 and may have another portion that leads to a side of the bottom wall 29 to discharge liquid outside of a side of the tub 2. Alternatively, the drain 294 may not have a portion that leads to a side of the bottom wall 29, and the bottom wall 29 may be spaced apart from the ground or floor to drain liquid downward. The drain 294 may be configured to communicate with an external or commercial drain (e.g., shower drain or bathtub drain), or may be used without an external drain.

When the water of the tub 2 is discharged, the fan 10 may operate. When the fan 10 is operated, a rotational flow of liquid occurs in the water inside the tub 2, and the rotational flow of liquid may wash an inside of the tub 2 (i.e., the bottom plate 92 and the inner wall 22a). An upper surface of the bottom frame 94 may be inclined toward the drain 946 so that liquid and other waste introduced to the bottom frame 94 is guided toward the drain 946.

Waste may first be filtered in filter 948 at the drain 946 of bottom frame 94. Filtrate that has passed through the filter 948 may flow through filter 82 of the filter assembly 8 to be additionally filtered. Filtrate passing through the filter 82 of the filter assembly 8 may filtered by the receiver 86 of the filter assembly 8, and filtrate that has passed through the receiver 86 may be discharged to the outside of the tub 2 via the drain 294 of the bottom wall 29.

The overflow hole 222 (see FIG. 1) of the tub 2 may be connected to or communicate with the drain 294 of the bottom wall 29. As an example, a waste passage or pipe may be formed in the rear wall 24 and the bottom wall 29 to connect the overflow hole 222 to the drain 294 of the bottom wall 29. The filter 948 of the bottom frame 94, the filter 82 of the filter assembly 8, and the receiver 86 may be removed from the recess 224 and washed with water.

Figure 9:
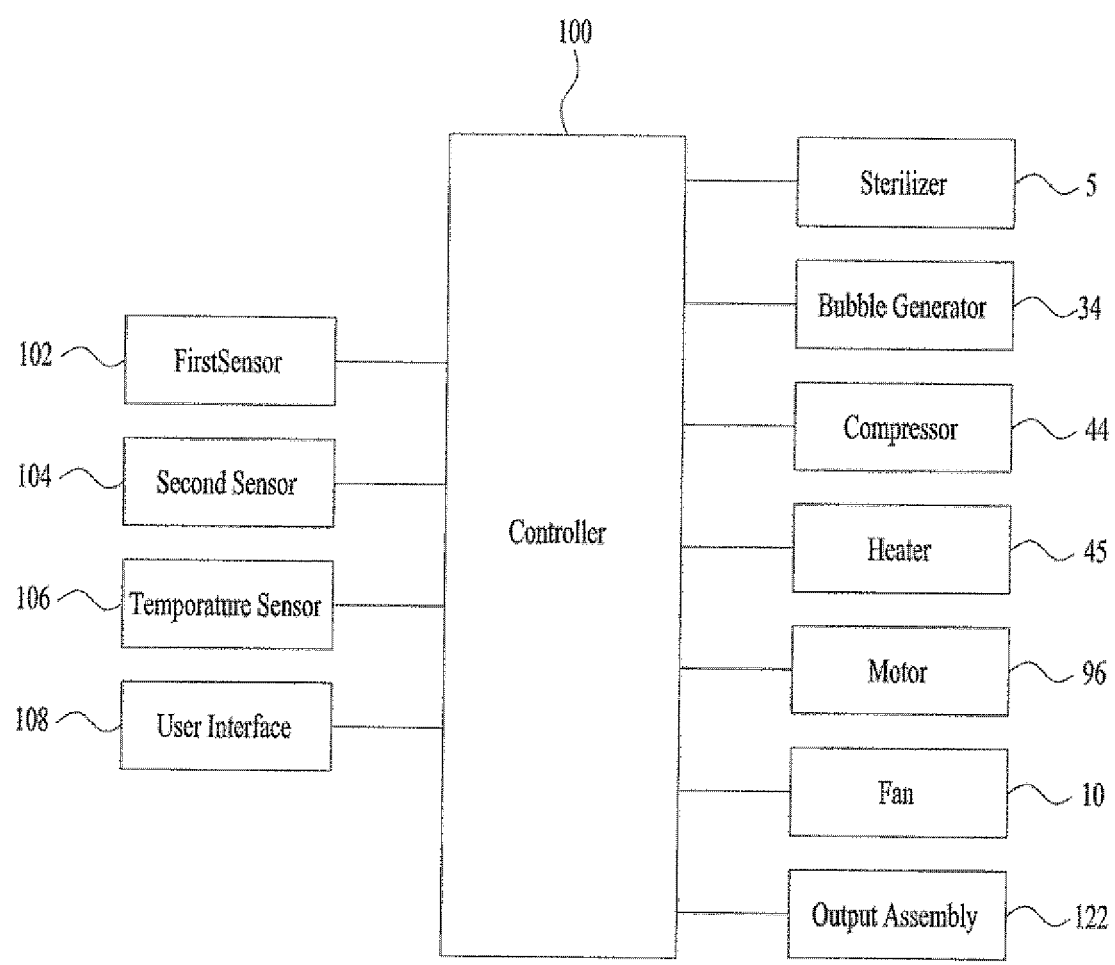
FIG. 9 is a block diagram showing a control of the tub.

Referring to FIG. 9, the tub 2 may include a controller 200. The controller 100 may have a predetermined algorithm. The tub 2 may include a first sensor 102 to sense whether an object (e.g., a pet P) is in the tub 2, second sensor 104 to sense whether the tub 2 is filled with liquid, and temperature sensor 106 to sense a temperature of the tub 2 and/or liquid in the tub 2. The first and second sensors 102 and 104 may be, for example, proximity sensors, weight sensors, capacitance sensors, ultrasonic sensors, pressure sensors, etc.

The first sensor 102, the second sensor 104, and the temperature sensor 106, may be connected to or electrically coupled with the controller 100. In addition, the controller 100 may be connected to or electrically coupled with a user interface or input assembly 108 (e.g., a touch panel) in which a user may input commands. The controller 100 may be connected to or electrically coupled with an output assembly 122 (e.g., liquid crystal display or LCD or light emitting diode or LED).

The controller 100 may be connected to or electrically coupled with the sterilizer 5, the bubble generator 34, the air compressor 44, a heater 45, the motor 96, the fan 10, and the output assembly 122. The controller 100 may receive a signal from the user interface 108 and output corresponding driving signal to the output assembly 122 via a determination process using a predetermined algorithm. Here, the devices such as the controller 100, the first sensor 102, second sensor 104, temperature sensor 106, user interface 108, output assembly 122, sterilizer 5, bubble generator 34, air compressor 44, heater 45, fan 10, motor 96, etc. are classified in terms of functions for convenience of description, and may not be necessarily separated in terms of hardware and software. Any suitable combination of hardware or software may be implemented.

Referring to FIGS. 4 and 9, a description of bathing and drying the pet will be described. The user may open or remove the cover 12 and place the pet P in the tub 2. The user may attach or close the cover 12 before bathing the pet P, or may leave the cover 12 removed or opened. When the first sensor 102 senses that a pet is in the tub 2, the sterilizer 5 may be operated for a predetermined sterilization time period. The user may bathe the pet P by adjusting the height, position, and inclination angle of the faucet 7 using the faucet holder 6.

When the second sensor 104 senses liquid in the tub 2 or senses that liquid is at a predetermined height or amount in the tub 2, the bubble generator 34 may be operated to supply microbubbles or jets to the inside of the tub 2 for a predetermined bubble time period through the jet 32.

When the bath of the pet P is completed, the user may instruct the controller 100 to start drying via the user interface 108. Alternatively, the user may instruct the controller 100 to start draining the tub 2 via the motor 96 and the bottom plate 92.

Before a drying process is started, the pet P may be temporarily removed from the tub 2. The output assembly 122 may prompt the user to remove the pet P. Alternatively, the pet P may be left in the tub 2 during a draining process.

When the first sensor 102 senses that a pet P is not in the tub 2 and the second sensor 104 senses that liquid is in the tub 2, the motor 96 may be driven to raise the bottom plate 92. Alternatively, in the case where the pet P is left in the tub 2, the motor 96 may be driven when the user selects a draining or drying command via the user interface 108 and the second sensor 104 senses that liquid is in the tub 2.

Once the bottom plate 92 has been lifted, the liquid of the tub 2 may flow between the bottom plate 92 and the bottom frame 94. The liquid may be discharged to the outside of the tub 2 via the drain 946 of the bottom frame 94, the filter assembly 8, and the drain 294 of the bottom wall 29.

When the motor 96 is operated to raise the bottom plate 92, the fan 10 may operated for a predetermined draining time to generate a rotating or swirling flow (e.g., whirlpool flow) in the liquid water being drained. This rotational flow of liquid may clean an inside of the tub 2 (i.e., the inner wall 22*a*).

When the second sensor 104 senses that liquid is not in the tub 2, the motor 10 may be driven to lower the bottom plate 92 to complete the draining process. After the draining process is complete, if the pet P was removed during the draining process, the output assembly 122 may prompt the user to place the pet P back in the tub 2 for the drying process. If the user has not attached or closed the cover 12, the user may attach or close the cover 12 before drying the pet P. Alternatively or in addition thereto, the output assembly 122 may instruct the user to attach the cover 12 to the tub 2 and/or close the cover 12.

When the first sensor 102 senses that the pet P is in the tub 2 and when the second sensor 104 senses that liquid is not in the tub 2, the air compressor 44 may be operated so that air is supplied to the inside of the tub 2 through the air outlets 42 for a predetermined drying time. The air supplied to the inside of the tub 2 may circulate vertically and horizontally to dry the pet P. Alternatively or in addition thereto, when the bubble generator 34 is configured to supply gas or air through the jets 32, air may be discharged from the jets 32 to additionally dry the pet P.

When drying of the pet P is completed, the cover 12 may be removed or retracted, and the pet P may be taken out of the tub 2. After drying, if the second sensor 104 senses that liquid is remaining in the tub 2, the draining process may be repeated.

After drying, when the first sensor 104 senses that a pet P is not in the tub 2 and the second sensor 104 senses that liquid is not in the tub 2, the sterilizer 5 may be operated to sterilize the inside of the tub 2 for a predetermined sterilization time period. The sterilizer 5 may be turned off after the predetermined sterilization time period has passed.

One of ordinary skill in the art should appreciate that, although an example is described where a pet P is being bathed and dried in the tub assembly 1, embodiments disclosed herein are not limited to pet use. For example, the tub assembly 1 may be varied in size to accommodate humans or larger species of animals. As another example, a smaller human or child may be bathed and dried in the tub assembly 1. As another example, clothes or other objects (e.g., fragile or delicate garments requiring handwashing)

may be washed and/or dried in the tub assembly 1. The first sensor 102 may be configured to sense different objects in the tub 2 other than pets P.

It is an object of the present disclosure to provide a pet bath in which a pet may be bathed efficiently. Another object of the present disclosure is to provide a pet bath in which the pet may be dried efficiently. Another object of the present disclosure is to provide a pet bath which may effectively sterilize bacteria adhered to or collected on the pet during bathing and drying of the pet.

Another object of the present disclosure is to provide a pet bath which may efficiently discharge or drain water or liquid of the pet bath after bathing. Another object of the present disclosure is to provide a pet bath which may efficiently filter contaminants when water stored in the pet bath is drained after bathing. Another object of the present disclosure is to provide a pet bath which may efficiently clean and sterilize the pet bath. Another object of the present disclosure is to provide a pet bath in which a user may bathe, dry, etc. the pet conveniently.

According to the present disclosure, a pet bath tub configured to hold or contain a pet may be provided with a jet or jet to discharge air bubbles or create jet streams. The tub may be provided with an air outlet to discharge air. The tub may be provided with a sterilizer. The tub may be provided with a bubble generator or jet system. The tub may also be provided with a compressor.

A cover may be provided to cover an upper opening of the tub. The tub may be rotatable and may be provided with a faucet holder to selectively fix a faucet or water outlet. A lower portion or bottom of the tub may be structured to effectively receive, store, or drain liquid or water filled in the tub. For example, the tub may be provided with a bottom frame that is hermetically sealed to a bottom of the tub. A bottom plate configured to move vertically (i.e., up and down) may be provided at an upper portion of the bottom frame. The bottom frame may be provided with a motor to move the bottom plate up and down. The bottom frame may be provided with a fan capable of swirling water or guiding a flow of water in the tub. The bottom frame may include a discharge portion or drain through which water from the tub is discharged or drained. A lower portion of the drain may be provided with or communicate with a filter assembly.

Embodiments disclosed herein may provide a tub configured to hold or contain a pet, a cover configured to at least partially cover an upper opening of the tub, a jet outlet provided in the tub to discharge bubbles or jets, an air outlet provided in the tub to discharge air, and a sterilizer to sterilize the pet or the tub. The air outlet may include a first air outlet and a second air outlet provided to face the first air outlet. The first air outlet may be inclined downward and the second air outlet may be inclined upward.

The cover may be configured to cover a portion of the upper opening of the tub. The second air outlet may be provided in a direction in which the cover and the tub are connected to each other. One of the first air outlet and the second air outlet may be inclined to the left and the other may be inclined to the right.

A bottom of the tub may be provided with a bottom frame to hermetically seal the tub. A top of the bottom frame may be provided with a bottom plate to move up and down or vertically. A motor may be provided to move the bottom plate up and down. The bottom frame may have a discharge portion or drain through which water from the tub is discharged or drained.

A filter assembly may be provided below the drain. The bottom frame may be provided with a fan to swirl or guide the water of the tub. The tub may include an inner wall and an outer wall. An intermediate space may be formed between the inner wall and the outer wall. The intermediate space may include a bubble or jet generator to generate bubbles or jets to supply air. A compressor may be provided.

The sterilizer may be a UV LED. A holder may be rotatably connected to the tub. The holder may have an adjustable height. An upper end of the holder may be provided with a fixing portion fixed to a faucet. The fixing portion may be tiltable.

Each feature of the above-described embodiments may be applied in combination with other embodiments unless they are inconsistent or exclusive with other embodiments.

According to the present disclosure, by using a bubbler or jet (e.g., micro bubbler) and by blowing air, a pet may be efficiently bathed and dried. By using a sterilizer, bacteria on the pet may be effectively sterilized and/or eliminated when bathing or drying the pet. The water in the pet tub may be efficiently discharged or drained via a lower structure of the tub after bathing the pet. By using a variety of filters, contaminants may be efficiently filtered when the water or liquid of the tub is discharged to the outside after bathing the pet.

When the water of the tub is discharged to generate a flow in the water of the tub, the tub may be efficiently cleaned after bathing the pet. In addition, the sterilizer installed in the tub may sterilize the tub. Due to the structure of the tub, a user may conveniently bathe and dry a pet.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A tub assembly, comprising:
   a tub formed by a sidewall, the sidewall having a bottom end and top end, the bottom end defining a first cross-sectional area and the top end defining an upper opening;
   a first bottom having a second cross-sectional area less than or equal to the first cross-sectional area;
   a second bottom provided below the first bottom, the second bottom having a third cross-sectional area greater than or equal to the second cross-sectional area; and,
   a drain provided in the second bottom, wherein the first bottom is configured to move toward the second bottom to seal a bottom end of the tub and away from the second bottom to allow drainage of a liquid in the tub to the drain.

2. The tub assembly of claim 1, wherein the tub comprises:
   a first side;
   a second side opposite the first side;
   a cover coupled to the top end of the sidewall at the first side and extending toward the second side to at least partially cover the upper opening;
   at least one first air outlet provided in the sidewall at the first side, the first air outlet being configured to discharge air toward the cover; and,
   at least one second air outlet provided in the sidewall at the second side, the second air outlet being configured to discharge air toward the first bottom.

3. The tub assembly of claim 1, wherein a filter assembly is provided below the drain.

4. The tub assembly of claim 3, wherein the filter assembly includes at least one mesh filter.

5. The tub assembly of claim 1, wherein the first bottom is provided with a fan to change a flow of water in the tub when the first bottom is moved away from the second bottom.

6. The tub assembly of claim 1, further comprising a faucet to supply liquid from an external water supply to the tub.

7. The tub assembly of claim 6, wherein the tub includes a faucet holder configured to support the faucet at a height higher than the upper opening of the tub.

8. The tub assembly of claim 7, wherein the faucet holder includes a faucet support to couple to the faucet, and the faucet support is configured to have an adjustable inclination relative to the upper opening of the tub.

9. The tub assembly of claim 7, wherein the faucet holder is rotatably connected to the tub and is configured to have an adjustable height.

10. The tub assembly of claim 7, wherein the faucet holder includes an inner pipe, an outer pipe, and a faucet support, the faucet support being coupled to the inner pipe, and the inner pipe being configured to insert into and out of the outer pipe for a height adjustment of the faucet holder.

11. The tub assembly of claim 1, further comprising at least one air outlet provided in the tub to discharge air.

12. The tub assembly of claim 11, wherein the at least one air outlet comprises at least one first air outlet provided at a first side of the side wall of the tub and at least one second air outlet provided at a second side of the side wall of the tub opposite the first side, the first air outlet being positioned to eject air downwards and the second air outlet positioned to eject air upwards.

13. The tub assembly of claim 12, further comprising a cover, and wherein the cover is coupled to an upper rim of the tub at the second side of the tub, and a bottom surface of the cover facing the upper opening has a concave curvature.

14. The tub assembly of claim 11, wherein the at least one air outlet comprises at least one first air outlet provided at a first side of the side wall of the tub and at least one second air outlet provided at a second side of the side wall of the tub opposite the first side, the first air outlet positioned to eject air toward to a third side of the side wall of the tub and the second air outlet positioned to eject air toward a fourth side of the side wall of the tub, the third and fourth sides being opposite to each other.

15. The tub assembly of claim 1, further comprising at least one jet provided in the tub configured to assist in creating bubbles in a liquid.

16. The tub assembly of claim 1, further comprising a sterilizer to sterilize an inside of the tub.

17. A tub assembly, comprising:
a tub having an upper rim defining an upper opening and a bottom; wherein the bottom of the tub includes:
   a bottom frame having a drain,
   a bottom plate configured to move relative to the bottom frame in a first direction to seal the bottom of the tub and relative to the bottom frame in a second direction to drain a liquid stored in the tub, the first and second directions being opposite.

18. The tub assembly of claim 17, wherein the bottom of the tub includes a bottom wall and a filter assembly, the bottom wall having a drain and the filter assembly being provided between the drain of the bottom frame and the drain of the bottom wall.

* * * * *